No. 857,081. PATENTED JUNE 18, 1907.
R. E. LINCOLN.
VARIABLE SPEED TRANSMISSION.
APPLICATION FILED FEB. 1, 1907.
3 SHEETS—SHEET 3.
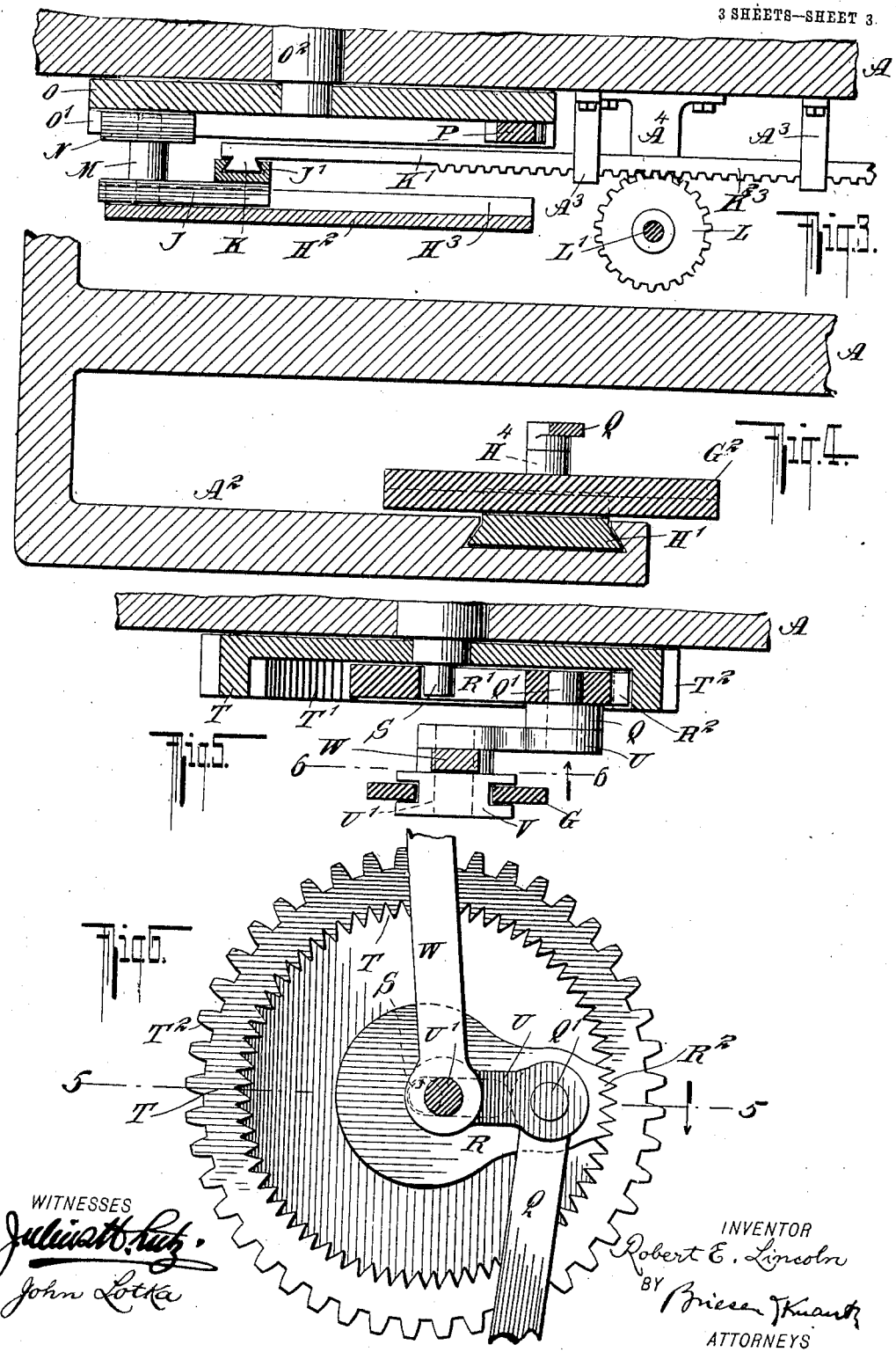
WITNESSES
INVENTOR
Robert E. Lincoln
BY
ATTORNEYS

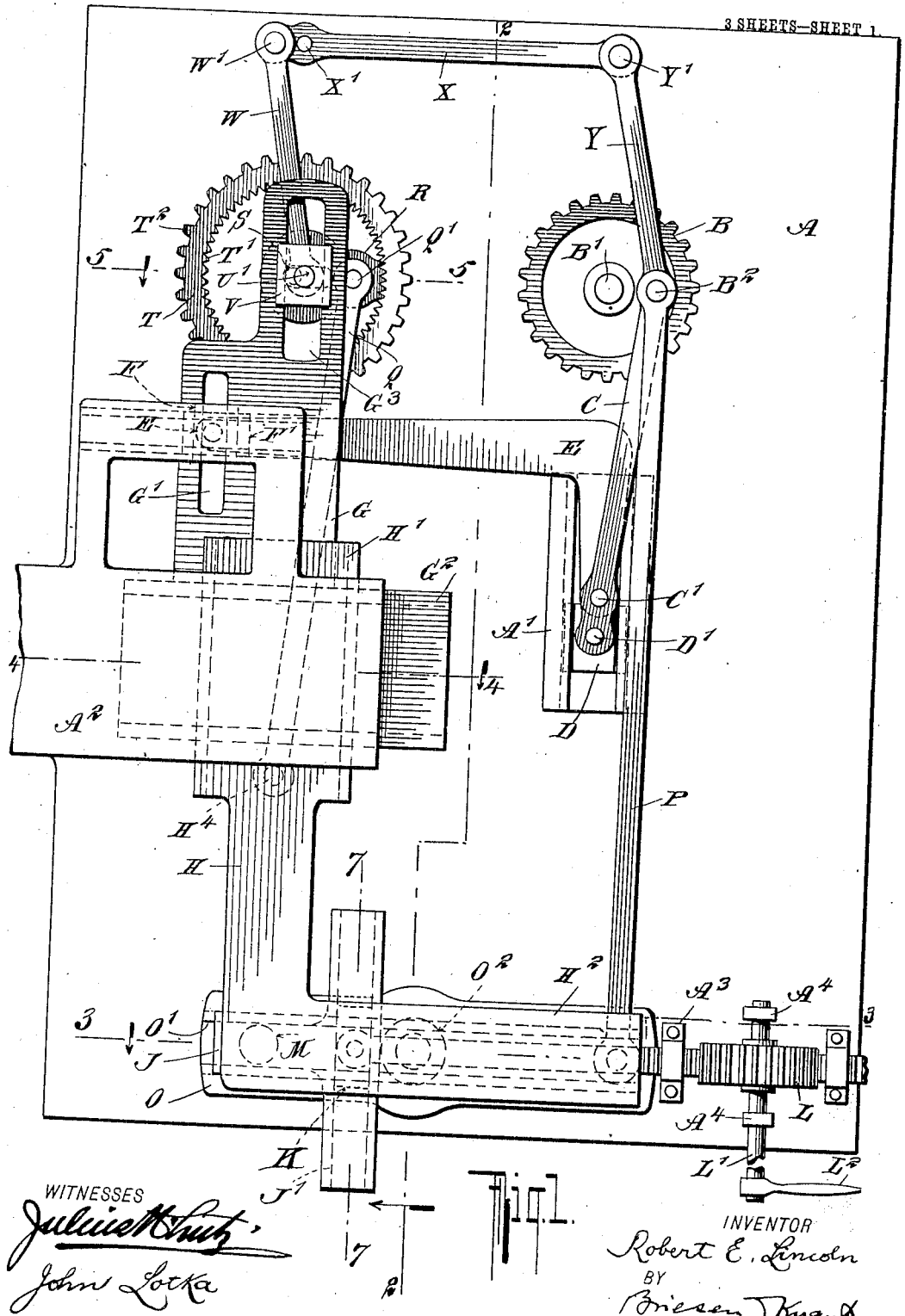

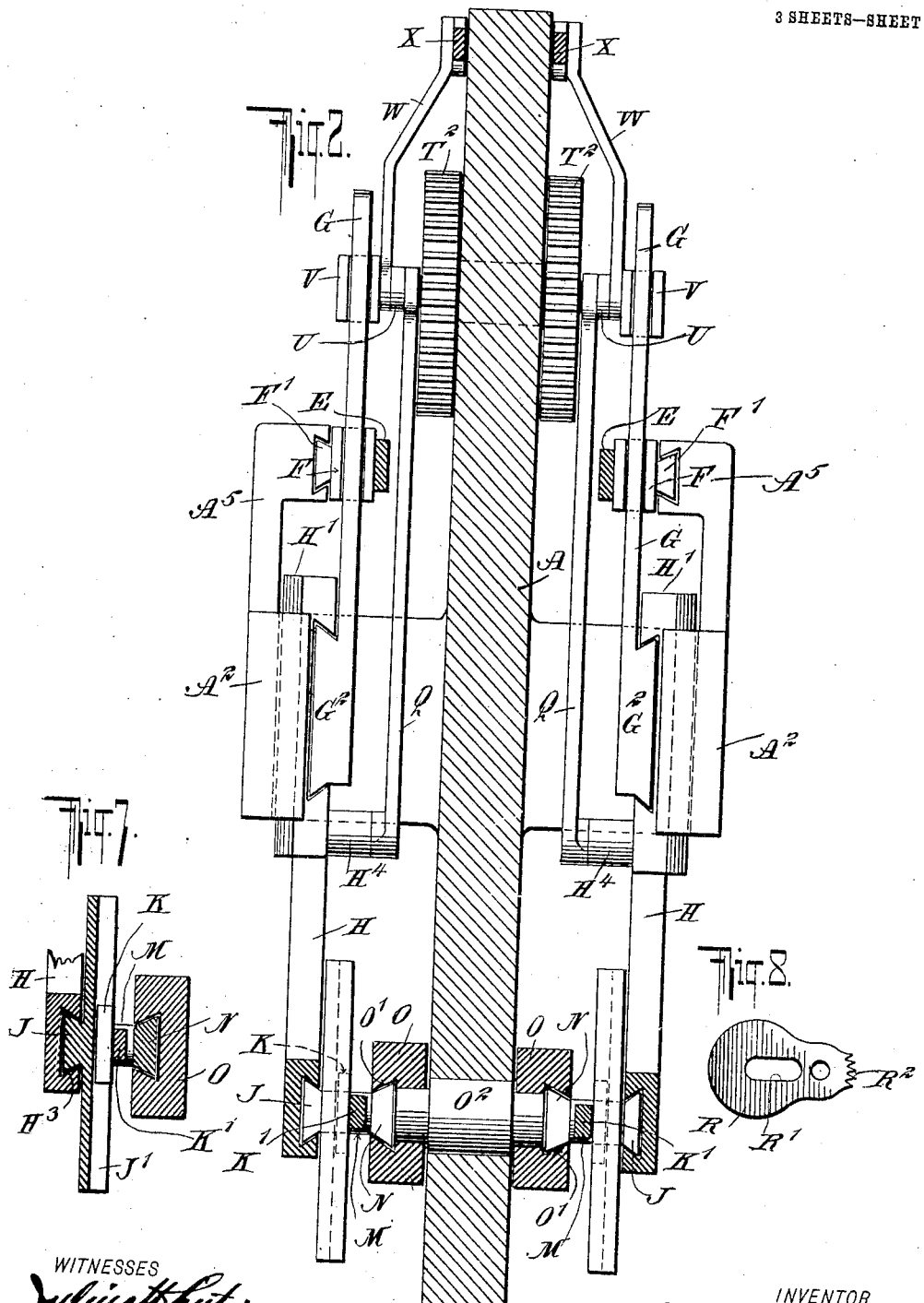

UNITED STATES PATENT OFFICE.

ROBERT E. LINCOLN, OF JERSEY CITY, NEW JERSEY.

VARIABLE-SPEED TRANSMISSION.

No. 857,081.            Specification of Letters Patent.            Patented June 18, 1907.

Application filed February 1, 1907. Serial No. 355,197.

*To all whom it may concern:*

Be it known that I, ROBERT E. LINCOLN, a citizen of the United States, and a resident of Jersey City, in the county of Hudson and State of New Jersey, have invented certain new and useful Improvements in Variable-Speed Transmissions, of which the following is a specification.

My invention relates to devices for transmitting power at a variable rate of speed, and has for its object to provide a (preferably reversible) mechanism for readily changing the speed of a driven member in a perfectly gradual manner while the speed of the driving member is constant or practically so.

I will now describe a specific embodiment of my invention with reference to the accompanying drawings, and then point out the features of novelty in the appended claims.

Figure 1 is an elevation of my power-transmitting device; Fig. 2 is a vertical section on line 2—2 of Fig. 1; Fig. 3 is a horizontal section on line 3—3 of Fig. 1, drawn upon an enlarged scale; Figs. 4 and 5 are similar views taken on lines 4—4 and 5—5 respectively of Fig. 1; the section line 5—5 being also indicated in Fig. 6; Fig. 6 is a detail face view of the driven member and parts connected therewith in section on line 6—6 of Fig. 5; Fig. 7 is a section on line 7—7 of Fig. 1, and Fig. 8 is a detail face view of the pawl for actuating the driven member.

The terms "horizontal" and "vertical" have been used only for the sake of convenience and not in any limiting sense, as the mechanism will work in any position.

A indicates a suitable frame on which the driving member B is journaled at B'. This driving member may be mounted directly on an engine shaft, or it may be formed as a gear wheel or sprocket wheel, as shown, to receive power from another gear wheel or a driving chain (not shown). By means of a crank pin $B^2$, and a connecting rod C, the driving member reciprocates a slide D moving in a guide A' and pivotally connected with said rod at D'. The rod C is pivotally connected at C' with an arm E the other end of which is pivotally connected at E' with a slide F working in a slideway G', and having a guide F' working in a stationary guideway $A^5$, at right angles to the guide A'. The slideway G' is parallel with the guide A', and is provided in a slide G movable at a right angle to said guide upon another slide H, being a dovetailed one as shown at $G^2$, or of any other suitable character. The slide H is movable upon a portion $A^2$ of the frame, for instance by means of a dovetail portion H', parallel with the slideway G' and guide A', and therefore at a right angle to the direction in which the slide G is movable on the slide H.

The slide H is provided, at the end opposite to that from which the slide G projects, with a rigid arm $H^2$ provided with a guideway $H^3$ at right angles to the direction of movement of the slide H. This guideway receives a T shaped slide J provided with a slideway J' parallel to the direction in which the slide H moves. Into the slideway J' is fitted a normally stationary, yet adjustable guide member K located at the end of an adjusting rod K' sliding in bearings $A^3$ and provided with rack teeth $K^2$. The rod K' and the guide member K can be adjusted by means of the pinion L, the shaft L' of which is journaled in stationary bearings $A^4$ and provided with a crank $L^2$. It will be understood that this adjusting mechanism governs the position of the slide J in the guideway $H^3$; that is, the slide L does not move relatively to the slide H except when the guide member K is being adjusted.

The slide J is pivotally connected by means of a pin M, with another slide N movable in a longitudinal guideway O' of a rocking lever O, fulcrumed on the frame at $O^2$. This lever is operated from the pin $B^2$ of the driving member B by means of a connecting rod P.

The slide H is pivotally connected at $H^4$ with a connecting rod Q the other end of which is fitted to a pin Q' by means of which the rod Q is pivotally connected with the driving pawl R. This pawl has a more or less radial slot R' which receives a pin S located at the center of the driven wheel T. The pin may either be a stationary stud, or as shown it may rotate with the wheel T and be journaled in the frame A. The driven wheel T has internal teeth T' adapted to be engaged by teeth $R^2$ of the pawl R; a single tooth on the pawl might do, but I prefer a plurality of them. With the pin Q' is pivotally connected a link U having a like connection at U' with a slide V movable in a guideway $G^3$. The distance between the centers of the pins Q' and U' is different from, and preferably less than, the distance from the center pin S and the pin Q' when the pawl is in the driving position shown in Fig. 1.

With the pin U′ is connected a rod W having at its other end a pivotal connection W′ with a lever X fulcrumed on the frame at X′ and receiving an oscillating motion by means of a connecting rod Y linked at Y′ to the lever X and at B² to the driving member B.

The driven member T may have teeth T² to transmit power by means of gearing or of a chain, or other suitable mechanism may be employed for this purpose. In order to secure a more uniform action, I prefer to arrange two devices of the above described character on opposite sides of the frame A, as shown in Fig. 2, one of the devices being set in a position differing from that of the other by 180° so that their operative periods will alternate. The two driving members B would be rigidly secured on the same shaft or journal B′, and the two pins B² would not be in line with each other, but at diametrically opposite points. The two driven members T would also be rigidly connected, as by securing each of them to the same center pin or journal S.—I prefer to arrange the centers of the pins H⁴, S and X′ in a straight line.

The operation is as follows (considering only one side of the apparatus, since both work in the same manner):—As the driving member B rotates, the arm E receives a transverse motion through the medium of the connecting rod C, and this causes the slide G to be reciprocated transversely on the guideway of the slide H. The slide V shares this movement of the slide G and thus carries the pin U′ from one side of the center S to the other. At the same time the position of the pin U is controlled by the rods W and Y and the lever X, which cause the slide V to reciprocate in the guideway G³. The pin U′ will therefore move in a curved path which becomes a circle if the longitudinal travel or stroke of the slide V is equal to the transverse travel of the slide G. If we assume that during this operation the point H⁴ remains stationary (as it will be under certain conditions of adjustment to be described presently) the above described movement of the pin U′ will, owing to the connection of the pawl R with said pin by the link U and with the pin H⁴ by the rod Q, cause the teeth R² of the driving pawl to be moved alternately into and out of engagement with the teeth T′ of the driven member T, without actuating said member, or at least without turning it appreciably. If now by a proper adjustment the slide H is given a slight reciprocating motion, the pin Q′ and with it the driving pawl R will be carried in a direction coinciding approximately with the movement of the slide H, and thus the driven member T will be given a partial rotation while the driving pawl is in engagement with it. Then the pawl will be carried out of engagement with the driving member, and while it is out of engagement, the return movement of the slide H will take place, bringing the pawl back to its original position for renewed engagement with the driving member. The length of the arc during which the pawl R remains in driving engagement with the driven member will depend on the stroke or travel of the slide H. Fig. 1 shows the pawl R at the central portion of its driving stroke. If the parts are so adjusted that the stroke of the slide H will be equal to twice the maximum distance between the centers of the pins S and Q′ (which maximum distance appears in Figs. 1 5, and 6) then the pawl R will remain in engagement with the driven member T permanently, both the pins U′ and Q′ in this case describing concentric circles about the pin S; the forward stroke of the slide H and the return stroke will be driving strokes in this particular extreme case. The stroke of the slide H is adjusted by means of the pinion L and rack bar K carrying the guide K′. According as the pin M is brought to one side or the other of the fulcrum O², the forward or the return stroke of the slide H will coincide with the time the pawl R is in engagement with the driven member T. The apparatus is thus reversible by shifting the connecting pins M from one side of the fulcrum O² to the other. When the pin M is exactly in alinement with the fulcrum O², the slide H will remain perfectly stationary. The farther the pin M is adjusted from the fulcrum O², the longer will be the stroke of the slide H, and the greater the speed of the driven member T. As the lever O rocks, the slide N rocks with it, and also moves to a certain extent lengthwise of the guideway O′ (except when the pin M alines with the fulcrum O²), since the pin M, owing to its connection with the slide J, can move only in unison with the slide H, as long as the adjustment of the slides J,—N remains the same.

By arranging mechanisms of the above-described character on opposite sides of the frame, and so connecting these mechanisms that their working periods will alternate, I obtain a more uniform action.

I claim:

1. The combination of the frame, the drive shaft, the rotary driven member provided with gear teeth, the driving pawl arranged to engage said teeth, the slide connected with the said pawl and movable transversely of said rotary member to bring the pawl into and out of engagement therewith, means controlled by the drive shaft, for reciprocating said slide, another slide on which the first-named slide is movable, the second slide being movable on the frame in a direction at a right angle to the movement of the first slide, mechanism connected with the second slide, for giving the pawl a swinging motion about the center of the rotary driven member, an operating connection from the drive shaft to the second slide to reciprocate the same, and adjusting mechanism for varying the movement of the second slide.

2. The combination of the frame, the drive shaft, the rotary driven member, the driving pawl, the slide connected with said pawl and arranged to move it into and out of engagement with said member, means, controlled by the drive shaft, for reciprocating said slide, another slide on which the first-named slide is movable, said second slide being movable on the frame in a direction at a right angle to the movement of the first slide, mechanism connected with the second slide for giving the pawl a swinging motion about the center of the driven member, an operating connection from the drive shaft to the second slide to reciprocate the same, and adjusting mechanism for varying the movement of the second slide.

3. The combination of the frame, the drive shaft, the rotary driven member, the driving pawl, the slide connected with said pawl and arranged to move it into and out of engagement with said member, means, controlled by the drive shaft, for reciprocating said slide, another slide on which the first-named slide is movable, said second slide being movable on the frame transversely to the movement of the first slide, mechanism connected with the second slide for giving the pawl a swinging motion about the center of the driven member, an operating connection from the drive shaft to the second slide to reciprocate the same, and adjusting mechanism for varying the movement of the second slide.

4. The combination of the frame, the drive shaft, the rotary driven member, the driving pawl, the slide connected with said pawl and arranged to move it into and out of engagement with said member, means, controlled by the drive shaft, for reciprocating said slide, another slide on which the first-named slide is movable, said second slide being movable on the frame transversely to the movement of the first slide, mechanism connected with the second slide, for giving the pawl a swinging motion about the center of the driven member, an operating connection from the drive shaft to the second slide to reciprocate the same, and adjusting mechanism for varying the throw of the second slide and also for reversing it.

5. The combination of the rotary driven member, the driving pawl, reciprocating means for moving said pawl into and out of engagement with the driven member, reciprocating mechanism for swinging said pawl, when engaged, about the center of the driven member, and adjusting means for varying the swinging movement of the pawl.

6. The combination of the rotary driven member, the driving pawl, a guide located at the center of the driven member and having sliding engagement with said pawl, means for moving the pawl into and out of engagement with the driven member, mechanism for swinging said pawl about the center of the driven member, and adjusting means for varying the swinging movement of the pawl.

7. The combination of the driven member, the driving pawl, means for moving the pawl into and out of engagement with the driven member, a reciprocating slide for moving the pawl and the driven member jointly while they are in engagement, a rocking lever, and an operative connection between the said lever and the slide, said connection being adjustable toward and from the lever's fulcrum.

8. The combination of the driven member, the driving pawl, means for moving the pawl into and out of engagement with the driven member, a reciprocating slide for moving the pawl and the driven member jointly while they are in engagement, a rocking lever, a second slide movable lengthwise of said lever, a third slide movable transversely of the first-named slide and pivotally connected with the second slide, and means for adjusting the second and third slides toward and from the lever's fulcrum.

9. The combination of the driven member, the driving pawl, means for moving the pawl into and out of engagement with the driven member, a reciprocating slide for moving the pawl and the driven member jointly while they are in engagement, a rocking lever, a second slide movable lengthwise of said lever, a third slide movable transversely of the first-named slide and pivotally connected with the second slide, and a normally stationary rack-bar mounted adjacent to said lever and adjustable lengthwise with the second and third slides.

10. The combination of the driven member, the driving pawl, mechanism for moving the pawl into and out of engagement with the driven member, the rocking lever, an operative connection between said lever and the pawl to move the latter jointly with the driven member while they are in engagement, and an adjusting device for shifting said connection from one side of the lever's fulcrum to the other.

11. The combination of the driven member, the driving pawl, means, connected with said pawl, for moving it in unison with the driving member when they are in engagement, a central pin on which the pawl may slide in or out, a link connected with the pawl at the point where said means are connected with it, a rod and a slide pivotally connected with said link, a transversely movable slide on which the first-named slide is movable lengthwise, a lever connected with said rod, and mechanism for rocking said lever while the second-named slide is moved transversely.

12. The combination of the driven member, the driving pawl, means for moving the pawl into and out of engagement with the driven member, a reciprocating slide for moving the pawl and the driven member jointly while they are in engagement, said slide being provided with a guideway arranged at an angle to its line of movement, a second slide movable along said guideway and itself provided with a guideway parallel to the line of motion of the first slide, a stationary guide engaging the guideway of the second slide, means for adjusting said guide transversely to the line of movement of the first slide, a third slide pivotally connected with the second slide, a lever provided with a longitudinal guideway for the third slide, and means for rocking said lever.

In testimony whereof, I have hereunto signed my name in the presence of two subscribing witnesses.

ROBERT E. LINCOLN.

Witnesses:
JOHN LOTKA,
JOHN A. KEHLENBECK.